United States Patent
Deist

[15] 3,669,978
[45] June 13, 1972

[54] PROCESS FOR THE PRODUCTION OF SEMI-SYNTHETIC PENICILLIN INTERMEDIATE

[72] Inventor: Robert P. Deist, Malvern, Pa.

[73] Assignee: American Home Products Corporation, New York, N.Y.

[22] Filed: May 28, 1970

[21] Appl. No.: 41,567

[52] U.S. Cl. ...........................................260/301, 260/239.1
[51] Int. Cl. ...................................C07d 99/10, C07d 99/16
[58] Field of Search ..........................260/301, 239.1, 306.7

[56] References Cited

UNITED STATES PATENTS

| | | | |
|---|---|---|---|
| 3,487,079 | 12/1969 | Sheehan | 260/239.1 |
| 3,553,202 | 1/1971 | Hatt et al. | 260/239.1 |
| 3,499,909 | 3/1970 | Weissenburger et al. | 260/243 C |

*Primary Examiner*—Nicholas S. Rizzo
*Attorney*—Andrew Kafko, Joseph Martin Weigman, Dwight J. Potter, Vito Victor Bellino and Robert Wiser

[57] ABSTRACT

A novel process for the preparation of an intermediate mixture which is useful in the production of penicillanic acid derivatives is described. The main component of the intermediate mixture is 2-[(6-amino-3,3-dimethyl-7-oxo-4-thia-1-azabicyclo[3,2,0]hept-2-yl)carbonyl]-1,2-benzisothiazol-3(2H)-one-1,1-dioxide hydrochloride.

6 Claims, No Drawings

PROCESS FOR THE PRODUCTION OF SEMI-SYNTHETIC PENICILLIN INTERMEDIATE

DESCRIPTION OF THE INVENTION

This invention is concerned with the preparation of an intermediate mixture which may be acylated to yield valuable semi-synthetic penicillanic acid derivatives of established therapeutic utility.

The process of the invention involves the chlorination of the saccharimide of benzyl penicillin or phenoxymethyl penicillin and the subsequent treatment with an alkanol to yield a mixture which comprises 2-[(6-amino-3,3-dimethyl-7-oxo-4-thia-1-azabicyclo[3,2,0]hept-2-yl)carbonyl]-1,2-benziosthiazol-3(2H)-one-1,1-dioxide hydrochloride and other reaction products.

For convenience hereinafter, the compound 2-[(6-amino-3,3-dimethyl-7-oxo-4-thia-azabicyclo[3,2,0]hept-2-yl)carbonyl]-1,2-benzisothiazol-3(2H)-one-1,1-dioxide hydrochloride will be referred to as "Saccharin 6APA hydrochloride."

In Netherlands Pat. No. 67,13809, which describes optimum procedures for conversion of penicillin esters to 6APA via the imino chloride and imino ester, yields are raised from about 50 to about 90 percent by reaction at temperatures below −20° C. and preferably at −40° to −60° C., rather than at 0° C. However, reaction of penicillin saccharimides by analogous procedures at these low temperatures resulted in poor yields of Saccharin 6APA hydrochloride. Contrary to the teachings of the Netherlands Patent, it was found that higher yields were obtained by raising rather than lowering the temperature of the reactions. In fact, optimum results with 75 to 85 percent overall yields of Saccharin 6APA hydrochloride were obtained at temperatures of +5° to +25° C.

Saccharin 6APA hydrochloride as produced according to the novel process of the invention may be isolated in pure form by washing the product obtained by the process of the invention with water. However, the low yield obtained and the difficulty encountered in removing the water used to separate the Saccharin 6APA hydrochloride renders this method economically unfeasible.

The preferred method of utilizing the product of the invention is to directly acylate the mixture of the Saccharin 6APA hydrochloride and the other reaction products and thereafter isolate in pure form the acylated 6APA product.

The process of the invention utilizes as a starting material the saccharimide of benzyl penicillin or phenoxymethyl penicillin which is prepared according to the following reaction scheme:

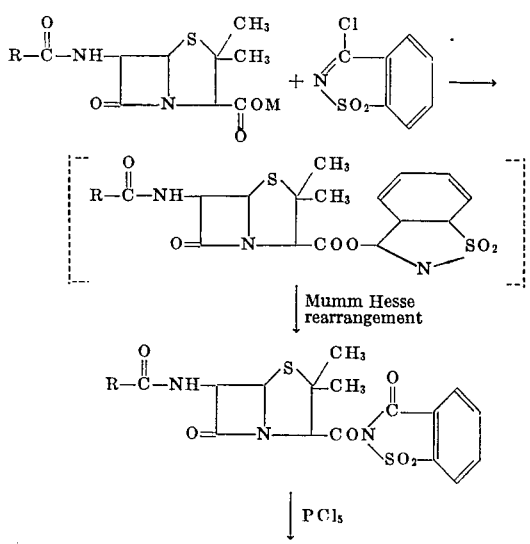

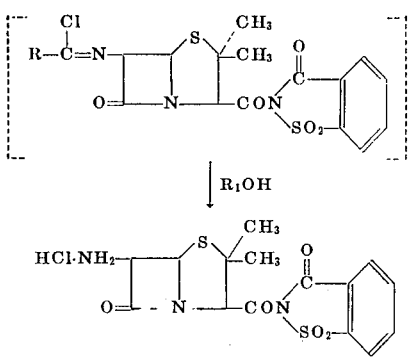

wherein R is benzyl or phenoxymethyl R₁ is (lower)alkoxy and M is potassium, sodium or hydrogen.

The initial temperature in the reaction of the penicillin compound employed and the pseudo saccharin chloride may be varied from 0° to 30° C. The reaction is performed in the presence of a non-polar inert organic solvent. Suitable solvents in which the reaction may be performed include methylene chloride, chloroform, carbontetrachloride and dichloroethane. The preferred solvents are methylene chloride and carbon tetrachloride or mixtures thereof. A suitable solvent mixture is carbon tetrachloride admixed with methylene chloride in the proportion of 1:9 parts by weight.

After mixing the reagents, the reaction mixture is kept at ambient temperatures (20°–25° C.). The reaction product of pseudo saccharin chloride and the particular penicillin derivative with which it is reacted may be aged for several days without producing any adverse effects in the subsequent process steps. The order of mixing is not critical and may be varied.

An acid acceptor is employed when the penicillin derivative is combined with the pseudo saccharin chloride. By the term acid acceptor as used herein is meant to include weak organic bases such as quinoline, pyridine,alpha, beta or gamma picoline, 2,6-lutidine, N-ethylpiperidine, triethylamine and N,N-dialkyl anilines such as N,N-dimethylaniline or N,N-diethylaniline. It is preferred to utilize N,N-dimethylaniline as an acid acceptor as higher yields of the final product are obtained when this acid acceptor is used.

The saccharimide of the penicillanic acid derivative employed is then chlorinated with phosphorous pentachloride. The phosphorous pentachloride may be added as a finely divided solid or as a methylene chloride slurry. The reaction is performed at a temperature of between about 5° C. and about 40° C., preferably 15° to about 30° C. In large scale procedures it may be desirable to cool the saccharimide mixture prior to adding the phosphorous pentachloride. If precooling is employed, the phosphorous pentachloride may be added as a more rapid rate than when it is added at ambient temperatures.

When precooling is employed, it is essential that the temperature of the reaction mixture be allowed to warm to at least above 5° C. so that the saccharimide compound will be completely chlorinated and no unchlorinated saccharimide penicillin will remain as a contaminant. The warming may be accomplished by withdrawing the cooling source and allowing the temperature to rise or by applying an external source of heat.

After addition of the phosphorous pentachloride, the imino chloride reaction mixture may be allowed to react for several hours at ambient temperatures. Prolonged reaction at ambient temperatures has no adverse effect. However, the mixture should be stored under nitrogen and protected from atmospheric moisture. Reaction times of about 1 to about 24 hours are commonly employed.

In the alcoholysis of the imino chloride intermediate, any suitable (lower)alkanol may be employed. Suitable examples include, methanol, ethanol, propanol, isopropanol, n-propanol and isobutanol. Methanol is preferred as in addition to lower cost, it produces an easier filtering product and facilitates solvent recovery.

The (lower)alkanol may be added to the imino chloride or the order of mixing may be reversed without affecting the yield of the product. The alcoholysis of the imino chloride is performed at temperatures of between about 5° C. and about 40° C. As in the chlorination step, the mixture may be precooled. If precooling has been utilized, the reaction mixture must be allowed to warm to at least above 5° C. to facilitate the completion of the process.

The product of the invention precipitates as a solid from the alkanolic mixture. It may be separated by filtration although other techniques well known to those skilled in the art may be used.

Water should not be added as it has been found that the use of even a small amount of water reduces the yield of the product. This is due to the fact that saccharin 6APA-hydrochloride polymerizes and hydrolyzes to form mixtures of undesirable products.

Although the purity of the product of the invention ranges from 70 to 80 percent, the major impurities are inorganic halides. Analysis of the product obtained using potassium penicillin G as a starting material and methylene chloride as solvent, showed the presence of 17 percent potassium chloride and 7 percent solvent, but only negligible amounts of starting material, 6APA, or saccharin. Since removal of the organic salts by washing with water results in degradation of the product and more difficult drying, it is advantageous to use the mixture directly for subsequent acylation steps basing the amount used on the purity as determined by iodometric assay. By this means various therapeutically active semi-synthetic penicillins may be obtained including ampicillin, dicloxacillin, nafcillin, oxacillin and the like.

The following examples are included to illustrate various embodiments of the invention but are not intended to limit the scope of the invention.

EXAMPLE I

Charge a 3 liter four-necked flask, which is equipped with a stirrer, thermometer and drying tube, with 120 g. potassium penicillin G, 450 ml. methylene chloride and 90 ml. N,N-dimethylaniline. At ambient temperature (20°-25° C.) add 71.6 g. pseudo saccharin chloride with stirring and wash in with 50 ml. methylene chloride. The white slurry changes to a relatively thin orange slurry upon addition of the saccharin chloride. There is no appreciable heat of reaction initially, however, after stirring for 30–60 minutes the orange slurry rather quickly transforms to a thick yellow slurry and the temperature rises to about 30° C. After stirring for 4 hours at ambient temperature the reaction is ready for the next step.

With the saccharin penicillin G slurry under nitrogen, 79.2 g. $PCl_5$ in 150 ml. methylene chloride is added in increments from an addition funnel which is equipped with a large bore stopcock and a stirrer. The addition is made at such a rate that the reaction temperature is maintained at 20°-25° C. with ice bath cooling. The addition time is 10-15 minutes. The yellow slurry of saccharin penicillin changes to a green solution upon addition of the $PCl_5$. The reaction mixture is stirred for an additional 3 hours at ambient temperature (20°-25° C.) during which time a pale green slurry forms.

After the reaction period has elapsed the imino chloride slurry is transferred by nitrogen pressure to a reactor containing 1 liter of methanol. The imino chloride is added with stirring at such a rate that the reaction temperature is maintained at 20°-25° C. with ice bath cooling. About 15 minutes is required for the addition and the mixture is then stirred for an additional 1 hour at 20°-25° C.

The reaction product is filtered off and washed with cold (10° C.) methanol (2 × 100 ml.). The methanol damp cake is slurried in 500 ml. of hexane for 10 minutes and then filtered and rinsed with an additional 250 ml. of hexane. The product is dried to constant weight in a circulating an oven at 30°-35° C. The product weighs 138.1 g. and contains 75.8 percent of saccharin 6APA hydrochloride calculated by iodometric assay which corresponds to 77.6 percent of theory based on potassium penicillin G.

EXAMPLE II

Charge a 3 liter four-necked flask, equipped with stirrer, thermometer and drying tube, with 120 g. of potassium penicillin G, 450 ml. of methylene chloride and 90 ml. of dimethylaniline. At ambient temperature (20°-25° C.) add 71.6 g. of pseudosaccharin chloride with stirring and wash in with 50 ml. of $CH_2Cl_2$. The white slurry changes to a relatively thin orange slurry upon addition of the saccharin chloride. There is no appreciable heat of reaction. After stirring for 30 to 60 minutes the orange slurry rather quickly transforms to a thick yellow slurry and the temperature may rise to approximately 30° C. After stirring for a period of 4 hours after addition of the saccharin chloride, the saccharin penicillin G is ready for further reaction. The saccharin penicillin G, however, can be held for prolonged periods with no apparent adverse effects. For convenience in the laboratory the slurry is usually held overnight at room temperature under nitrogen. Storage at room temperature for as long as three days does not appear harmful.

The saccharin penicillin G slurry under nitrogen is cooled to −10° C. A slurry of 79.2 g. of $PCl_5$ in 150 ml. of $CH_2Cl_2$ is added in increments from an additional funnel which is equipped with a large bore stopcock and a stirrer. The addition is made at such a rate that the reaction temperature is maintained between −5° and −10° C. Addition time is usually 10 to 15 minutes. The yellow slurry of saccharin penicillin turns to a green brown or olive colored slurry upon addition of $PCl_5$. After all of the $PCl_5$ is added cooling is removed and the slurry allowed to warm to room temperature over a period of approximately 1 hour. The mixture is stirred for an additional 3 hours at room temperature during which time the slurry becomes a pale green or yellowish green color.

After the aging period of the chlorination reaction mixture is complete the imino chloride slurry is transferred by nitrogen pressure to a reactor containing 1 liter of methanol which has been precooled to −10° C. The imino chloride is added to the methanol with stirring while maintaining the temperature at −5° to −10° C. About 15 minutes is required to add the imino chloride to the methanol. When the transfer is complete the cooling is removed and the reaction mixture is slowly warmed to room temperature over a period of 1 hour and stirred for 1 hour additional at 20° to 25° C.

The product is filtered and washed with cold 5° - 10° C. methanol (2 × 100 ml). The methanol damp cake is slurried in 500 ml. hexane for 10 minutes, then filtered and rinsed with an additional 250 ml. hexane. The product is then dried to constant weight in a circulating air oven at 30°-35° C. The product weighs 151 grams and contains 75.8 percent of saccharin 6APA hydrochloride calculated by iodometric assay which corresponds to 84.7 percent of theory based on potassium penicillin G.

EXAMPLE III

As in Example II except reaction of saccharin chloride with potassium penicillin G was begun at 0°-5° C. After mixing was complete the temperature was allowed to rise to ambient temperature. Yield 81.6 percent based on assay. Iodometric assay 78 percent.

EXAMPLE IV

As in Example II except 0.1 scale and using an equivalent amount of quinoline in place of N,N-dimethylaniline. Yield 32 percent on assay basis. Iodometric assay 82 percent.

EXAMPLE V

As in Example III except that an equal volume of isobutanol was used in place of methanol. Yield 77 percent based on assay. Iodometric assay 69 percent.

EXAMPLE VI

As in Example II except that an equal volume of ethanol was used in place of methanol. Yield 89 percent based on iodometric assay. Iodometric assay 75 percent.

EXAMPLE VII

As in Example VI except that addition of PCl$_5$ and aging of imino chloride was carried out at +20° to +25° C. Weight yield 88 percent. Infrared spectrum, identical to authentic material.

EXAMPLE VIII

As in Example II except that methanol was added to the imino chloride which was precooled to −10° C. and the mixture was allowed to react at 20°–25° C. for 1 hour. Yield based on assay 80 percent. Iodometric assay 75 percent.

EXAMPLE IX 11.3 g. (0.0323 M) penicillin V acid was suspended in 40 ml. carbon tetrachloride, 10 ml. methylene chloride and 4.8 ml. (0.038 M) N,N-dimethylaniline. 7.2 g. (0.036 M) pseudo Saccharin chloride was added with stirring at room temperature and the mixture stirred for 4 hours. To the resultant thick yellow slurry an additional 9 ml. N,N-dimethylaniline was added and the mixture cooled to −5° to −10° C. 7.9 g. (0.038 M) finely divided phosphorous pentachloride was added with stirring to the cold mixture which was then allowed to warm slowly to room temperature and stir overnight. The dark green slurry was cooled to 0°–5° C. and 100 ml. isobutanol which had been precooled in an ice bath was added rapidly with stirring. The green slurry was left to warm to room temperature and stirred for an additional 4 hours. The reaction mixture which had changed color from a green to a yellow slurry was filtered then reslurried in methylene chloride and again filtered. The product was dried in a forced air drier at 50° C. Eight grams product was obtained. The infrared spectrum was identical to that of authentic Saccharin 6APA hydrochloride and the iodometric assay was 409 mcg./mg.

EXAMPLE X

Charge to a 1 liter three-neck flask fitted with stirrer, thermometer, nitrogen inlet tube, and dropping funnel, 98.4 g. of the product obtained in Example I (0.178 mole), and 400 ml. of methylene chloride. Cool the white suspension to −10° C. and added from the dropping funnel, 46.7 g. of triethylamine as rapidly as possible maintaining the temperature −8° to −10° C. Without delay start the addition of 45.6 g. (0.195 mole) of β-ethoxynaphthoyl chloride in small portions over one-half hour at −5° to −10° C. Then allow the mixture to warm to 0° C. over one-half hour and stir for 1 hour.

Pour the yellow reaction mixture into a mixture of 50 g. of ice and 150 ml. of cold water with rapid stirring. Adjust the pH to 4.0 at 0°–5° C. with dilute sulfuric acid. Filter the two-phase mixture and then separate the layers. Pour the methylene chloride layer into a vigorously stirred solution of 49 g. pyridine and 150 ml. water at 25°–30° C. under nitrogen and stir the mixture for 1 hour.

Cool the clear, two-phase mixture to 0°–5° C., adjust the pH to 4.0 with dilute sulfuric acid, and separate the layers. Add the methylene chloride layer to a rapidly stirred mixture of 50 g. ice and 150 ml. cold water, and at 0°–5° C. add dilute sodium hydroxide solution to pH 11.0. After separating the layers reextract the methylene chloride layer two more times with 100 ml. of water at pH 10–11. Without delay, add 35 ml. of methylisobutylketone to the combined aqueous extracts and adjust the pH to 2.8–3.0 with dilute sulfuric acid at 0°–5° C. Seed the mixture with nafcillin acid and allow to stir overnight at 0°–10° C.

Collect the pale yellow solid by filtration, wash thoroughly with methylisobutylketone, then wash with water, and dry at 45° C. The yield of nafcillin acid is 56.6 g. or 77 percent of theory; purity by bioassay, 97 percent.

EXAMPLE XI

Charge to a 3 liter beaker furnished with stirrer, thermometer, pH probe and a dropping funnel, 1,000 ml. acetonitrile and 250 ml. water. Cool the mixture to 0° to −5° C. in an ice-salt bath and add 103 g. of the product obtained in Example VIII (0.185 mole).

Immediately start adding to the white suspension with vigorous stirring approximately 8.1 g. triethylamine to bring the pH to 3.9, while maintaining a temperature of 0° to −5° C. Start adding concurrently 56.7 g. (0.195 mole) 3-(2,6-dichlorophenyl)-5-methylisoxazole-4-carbonyl chloride in portions and approximately 29.6 g. triethylamine dropwise over one-half hour so as to maintain the pH at 3.5–4.0 and temperature 0° to −5° C. Let the reaction mixture stir for 1 hour at this temperature and then add 750 ml. water rapidly. After stirring for 1 ½ hours more collect the white solid by filtration and wash with water.

Charge to a 3 liter beaker furnished with stirrer, thermometer, pH probe and a dropping funnel, 600 ml. acetonitrile and 300 ml. water. While heating this solution to 27° C., add 29.5 g. pyridine and dilute sulfuric acid solution to adjust pH to 4.5. Add the wet intermediate to this vigorously stirring solution at 27° C.; within 10 minutes the pH drops to about 4.3. Add 19.5 g. pyridine dropwise over about 12 minutes to maintain a pH of 4.0–4.5 and allow the mixture to stir for an additional 10 minutes to give complete solution. Let the clear solution stir for 10 minutes more and adjust pH to 2.9 with dilute sulfuric acid. Add dropwise over 1 ½ hours, 1,800 ml. water at room temperature.

After cooling the mixture, collect the Dicloxacillin acid by filtration, wash, and dry at 45° C. The yield is 72.2 g. or 83 percent of theory; iodometric assay, 895 mcg. per mg.

I claim:

1. A process which comprises contacting a compound of the formula

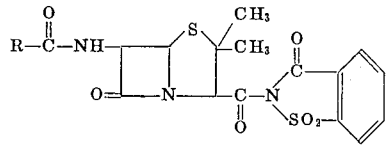

wherein R is selected from the group consisting of benzyl and phenoxymethyl, with phosphorous pentachloride in the presence of an acid acceptor and an inert organic solvent at a temperature of from about 5° to about 40° C. and thereafter admixing the reaction mixture with a (lower)alkanol and recovering the product.

2. A process according to claim 1 wherein R is benzyl.

3. A process according to claim 1 wherein R is phenoxymethyl.

4. A process according to claim 1 wherein the (lower) alkanol is methanol.

5. A process according to claim 1 wherein the reaction conducted at a temperature of about 15° to about 30° C.

6. A process according to claim 1 wherein the acid acceptor is N,N-dimethylaniline.

* * * * *